United States Patent [19]

Dumas

[11] Patent Number: 4,640,575
[45] Date of Patent: Feb. 3, 1987

[54] FIBER OPTIC CONNECTOR COVER APPARATUS

[75] Inventor: Theodore A. Dumas, Dallas, Tex.

[73] Assignee: Rockwell International Corporation, El Segundo, Calif.

[21] Appl. No.: 818,517

[22] Filed: Jan. 13, 1986

[51] Int. Cl.$^4$ .................................................. G02B 6/42
[52] U.S. Cl. ............................... 350/96.20; 350/96.10; 292/1; 292/DIG. 11
[58] Field of Search ............... 350/96.10, 96.15, 96.20, 350/96.21, 96.22; 250/227, 551; 160/368.2, 405, DIG. 8; 292/1, 319, 320, 321, DIG. 11

[56] References Cited

U.S. PATENT DOCUMENTS

| | | | |
|---|---|---|---|
| 4,162,119 | 7/1979 | Goodman | 350/96.21 |
| 4,255,015 | 3/1981 | Adams et al. | 350/96.20 |
| 4,411,491 | 10/1983 | Larkin et al. | 350/96.21 |
| 4,557,554 | 12/1985 | Blanc | 350/96.20 |

FOREIGN PATENT DOCUMENTS

| | | | |
|---|---|---|---|
| 0113991 | 7/1984 | European Pat. Off. | 350/96.20 |
| 56-107205 | 8/1981 | Japan | 350/96.20 |
| 57-142607 | 9/1982 | Japan | 350/96.20 |

OTHER PUBLICATIONS

Noel et al, "Safety Closure for Fiber-Optic Devices," *IBM Tech. Discl. Bulletin*, vol. 22, No. 6, Nov. 1979, pp. 2393-2394.

*Primary Examiner*—John Lee
*Attorney, Agent, or Firm*—Bruce C. Lutz; V. L. Sewell; H. Fredrick Hamann

[57] ABSTRACT

A flexible flap, having an elastic memory, which flap is used to normally cover a lightwave connector so as to prevent laser radiation emissions from the connector. The flexible nature of the flap allows the forcible deflection thereof, so that a mating connector can be attached to the normally covered one, and yet when the mating connector is removed the flap will automatically return to the covering position. In addition to preventing the emission of laser radiations, the flap can reduce contamination materials, such as dust, from covering the end of the fiber optic material.

4 Claims, 3 Drawing Figures

FIBER OPTIC CONNECTOR COVER APPARATUS

THE INVENTION

The present invention is generally concerned with fiber optics, and more specifically, with a cover or shield for automatically keeping the end of an unconnected fiber optic connector shielded such that it does not emit laser radiation or become contaminated with dust particles.

BACKGROUND

Metal shields and separate dust caps have been used in the prior art. However, the caps are often lost when fiber optic cables are installed. Typical prior art shields that have been used in the past have been thin and flexible to permit installation of the cable. However, these shields have had sharp edges which have tended to cut the fingers of those installing mating cables. Further, these shields have not provided any protection against dust entering the fiber optic connector.

Thus, the present invention comprises a flexible flap, molded shield or cover, such as rubber, which automatically closes over the connector when the mating fiber optic cable is removed. The cover is designed to form a dust tight seal when pressure is applied to the surface of the seal along the axis of the connector, whereby the optic fiber is not contaminated with dust particles when not in use. Even without the pressure, a shield is provided to prevent the emission of laser radiation which could damage eyes that happen to be looking into the end of the unconnected fiber optic connector.

It is thus an object of the present invention to provide an improved light radiation shield and dust cover for an unconnected fiber optic connector.

Other objects and advantages will be apparent to one skilled in the art from a reading of the specification and claims in conjunction with the drawings, where:

DETAILED DESCRIPTION

Figure 1:
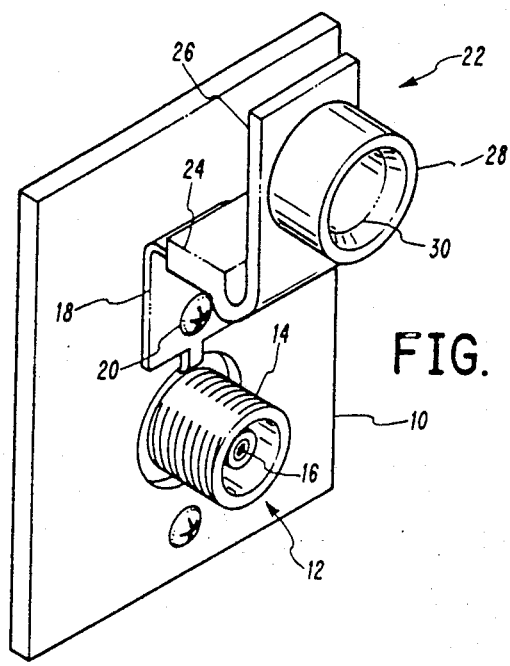
FIG. 1 is a view of the connector and shield wherein the shield is fully deflected for facilitating the connection of the connector shown to a mating fiber optic connector.

A support 10 is used for mounting a lightwave connector 12 having a threaded or plain boss engaging means 14 and central fiber optic cable 16. In addition, an L-shaped base 18 of the shield is also connected to the support 10 via a screw 20. A unitary, L-shaped flexible flap, shield or cover generally designated as 22 and having an elastic memory is attached to the base 18 at one end 24. The opposite end of shield 24 is labeled as 26 and it contains a cylindrical and tubular female cavity or attachment means 28 comprising a part of the shield 22. This female attachment means 28 also includes at least one interior annular surface means 30 having a retentive ring the combination of which may be used to interact with the threads 14, as will be later described.

Figure 2:
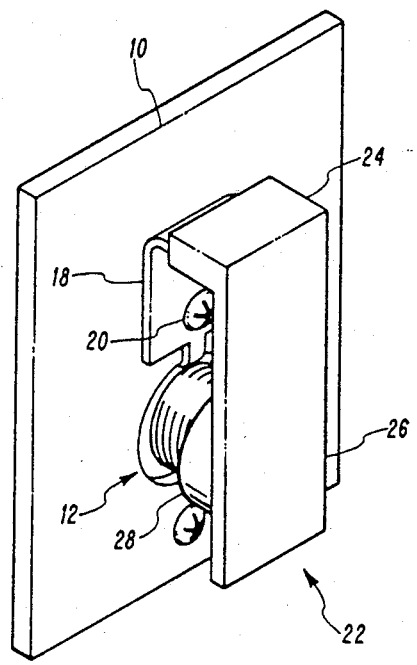
FIG. 2 is a view of the shield in place without the engagement of the mating portion of the shield to the connector.

In FIG. 2, the same designations are used as in FIG. 1. In FIG. 2, the shield is in its normal and unflexed position. This is the position to which the shield is automatically returned by its elastic memory when it is not forcibly deflected therefrom.

Figure 3:
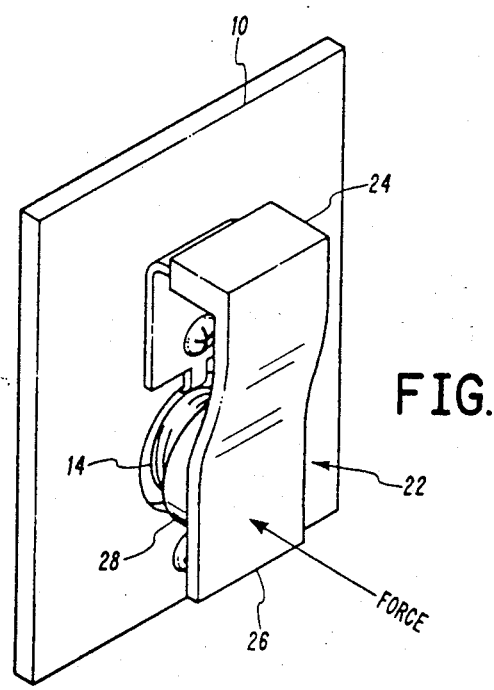
FIG. 3 is a illustration of the shield with the dust cover actively engaged with the connector to prevent contaminants from entering the unconnected connector.

In FIG. 3, a force has been applied in the direction shown to the surface of shield 22. Thus, the annular surface means 30 of FIG. 1 engages with the engaging means 14. The close fit thus maintains the shield in the deformed condition until it is forcibly returned to the positions of either FIGS. 1 or 2. The condition of FIG. 2 merely provides light emitting shield conditions, which in FIG. 3, is not only a light shield, but also is a dust cover. The application of the force is substantially in line with the axis of the connector 12.

Although not shown, a mating female lightwave connector would typically be attached to the connector 12 of FIG. 1, when the shield is deflected as shown in FIG. 1.

OPERATION

While it is believed, from the above information, the operation of the present invention is reasonably straightforward, it may be summarized in that the shield or cover 22 is normally in the position shown in FIG. 2, where it shields the connector 12 from emitting lightwave or laser radiation, whereby the eye of an individual looking in the direction of the connector cannot be harmed. The shield can be deflected away from the connector 12 in a manner shown in FIG. 1, whereby a mating connector and lightwave cable can be connected to the connector 12.

When it is desired to provide a dust shield or provide contamination prevention, force can be applied to the end 26 of shield 22 in the direction shown by the arrow labeled FORCE. This will provide engagement between the annular surface 30 of the female attachment means 28 and the boss 14 of connector 12. The close fit and the flexible nature of the molded material will provide a secure displacement of the shield, and yet allow easy removal for connecting fiber optic cables at a future time.

Although specific sizes and shapes of the inventive concept have been illustrated, I do not wish to be limited to these specific features, but only by the scope of the appended claims, wherein I claim.

1. Combination dust cover and radiation shield comprising, in combination:

L-shaped base means including mounting means for attaching said base means to a support adjacent a cylindrical male lightwave connector means, said male connector means including at least one annular surface engaging means; and unitary L-shaped flexible shield means including first attachment means for connection to said base means at one end thereof and a cylindrical and tubular female second attachment means, having at least one interior annular surface, at the other end thereof for engagement with the male lightwave connector means, said shield means having a normal position wherein the female second attachment means covers the male lightwave connector means, said shield means also having an elastic memory so that it may be flexed out of its normal position of covering the lightwave connector means whereby a female lightwave connector may be attached to the male lightwave connector means and said shield means will return to said normal position, the application of force in line with an axis of said lightwave connector means and to said other end of said flexible shield means causing said annular surface of said shield means to interact with said male lightwave connector means to form a dust cover for said male lightwave connector means.

2. Connector apparatus comprising, in combination:

support means including shield mounting means, for attachment to a cylindrical male lightwave conductor shielding means, and lightwave transmission male connector means, wherein said male connector means includes at least one annular surface engaging means;

unitary L-shaped flexible shield means including first attachment means for attachment to said shield mounting means at one end thereof and a cylindrical and tubular female second attachment means at the other end thereof, said shield means having a normal position wherein the female second attachment means covers the male lightwave connector means whereby light is prevented from being emitted from said male connector means, said shield means also having an elastic memory so that it may be flexed out of its normal position of covering the lightwave connector means whereby a female lightwave connector may be attached to the male lightwave connector means and said shield means will attempt to return to said normal position; and at least one interior annular surface means contained in said second attachment means, at said other end of said shield means, for engagement with the lightwave connector means, the application of force in line with an axis of said lightwave connector means and to said other end of said flexible shield means causing said annular surface means of said shield means to interact with said male lightwave connector means to form a dust cover for said male lightwave connector means.

3. The method of shielding the output of a support mounted lightwave connector means comprising, the steps of:

forming a flexible female cavity, including a least one cavity annular surface for engaging said lightwave connector means, at one end of a length of elastic memory type material; and attaching the other end of said length of elastic memory type material adjacent said support mounted lightwave connector means whereby the cavity normally covers and shields said lightwave connector means from providing light output while allowing forceable, but temporary, displacement of said cavity so that a mating lightwave connector means may be connected to said support mounted lightwave connector means.

4. Apparatus for shielding the output of a support mounted lightwave connector means comprising, in combination:

support means;

lightwave connector means mounted on said support means;

a length of elastic memory type material having at one end thereof means forming a flexible female cavity, said cavity including at least one annular surface for engaging said lightwave connector means; and means for attaching the other end of said length of elastic memory type material to said support means adjacent said lightwave connector means whereby the cavity normally covers and shields said lightwave connector means from providing light output while allowing forceable, but temporary, displacement of said cavity so that a mating lightwave connector means may be connected to said support mounted lightwave connector means.

* * * * *